United States Patent
Fisher, III et al.

(10) Patent No.: US 12,381,903 B2
(45) Date of Patent: Aug. 5, 2025

(54) MODELING CYBERSPACE OPERATIONS AND OPERATION EFFECTIVENESS

(71) Applicant: Applied Research Associates, Inc., Albuquerque, NM (US)

(72) Inventors: Charles Edward Fisher, III, Zebulon, NC (US); Steven J. Lorenc, Wake Forest, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 327 days.

(21) Appl. No.: 18/178,264

(22) Filed: Mar. 3, 2023

(65) Prior Publication Data

US 2024/0297892 A1    Sep. 5, 2024

(51) Int. Cl.
*H04L 9/40* (2022.01)

(52) U.S. Cl.
CPC .................. *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 12,238,132 | B2 * | 2/2025 | Albanese | H04L 63/1466 |
| 2005/0193430 | A1 * | 9/2005 | Cohen | H04L 63/1433 726/25 |
| 2014/0245449 | A1 * | 8/2014 | Powell | H04L 63/1433 726/25 |
| 2023/0047450 | A1 * | 2/2023 | Koo | H04L 63/1433 |

FOREIGN PATENT DOCUMENTS

| | | | | |
|---|---|---|---|---|
| CN | 109547401 A | * | 3/2019 | ........... G06F 21/606 |
| CN | 108200095 B | * | 2/2021 | ........... H04L 41/145 |
| CN | 112422573 A | * | 2/2021 | ............. G06N 7/005 |
| CN | 112904817 A | * | 6/2021 | ....... G05B 19/41865 |
| CN | 116112278 A | * | 5/2023 | ........... H04L 41/147 |
| CN | 116582349 A | * | 8/2023 | |
| CN | 116743468 A | * | 9/2023 | |
| CN | 118118223 A | * | 5/2024 | |
| CN | 118802353 A | * | 10/2024 | |
| WO | WO-2020093201 A1 | * | 5/2020 | ............. G06N 20/00 |

OTHER PUBLICATIONS

Li et al. English translation of CN 112904817 A. (Year: 2021).*

* cited by examiner

*Primary Examiner* — Sarah Su

(74) *Attorney, Agent, or Firm* — Erise IP, P.A.

(57) ABSTRACT

A method, system, and computer-readable media for modeling cyberspace operations and the effects thereof. Network and connectivity data for an operational environment model may be retrieved from a network scan. Likelihood data that a network element takes a plurality of possible configurations may be mapped. Determination of a probability of effect of a capability acting on the network element may be based on the likelihood data and uncertainties associated with the capability. Multiple attacks within the operational environment model may be modeled to determine an attack path therethrough. Functional modeling techniques to model functional impacts of attacks on an operational environment model are also disclosed.

20 Claims, 8 Drawing Sheets

MODELING CYBERSPACE OPERATIONS AND OPERATION EFFECTIVENESS

STATEMENT OF GOVERNMENTAL SUPPORT

This invention was made with government support under government contract number W91CRB22F0179 awarded by the Department of Defense. The government has certain rights in the invention.

BACKGROUND

1. Field

Embodiments of the present disclosure relate to cybersecurity. More specifically, embodiments of the present disclosure relate to systems and methods for modeling cyberspace operations and operation effectiveness.

2. Background

Offensive cyberoperations are an essential part of providing offensive and defensive cyber capabilities to achieve efforts or conduct operations in cyberspace. Broadly, offensive cyberoperations rely on exploiting one or more vulnerabilities in a target network, and these vulnerabilities are commonly limited to particular versions of particular software or hardware deployed in the target network, and well as the interior organization of the target network. The likelihood of success of a particular cyberoperation may thus depend on a variety of factors which are incompletely characterized. Furthermore, a failure may alert operators of a target network of the cyberoperation, so undertaking operations only with a high likelihood of success is important in the overall mission planning.

However, traditional methods of estimating the likelihood of success and probable effects of particular cyberoperations rely on intuitive understandings of the various components and connections of the target network and the correlations between them. The traditional methods thus depend on the particular analyst evaluating a given cyberoperation and thus fail to provide a repeatable model that consistently outputs the same likely outcome of the operation when given the same inputs. Accordingly, what is needed is an improved set of systems and methods for modeling cyberspace operations and operation effectiveness, by integrating known information and uncertainties regarding the target network to determine the likelihood of success and probable effects of potential cyberoperations.

SUMMARY

Embodiments of the present disclosure solve the above-mentioned problems by providing systems, methods, and computer-readable media for modeling cyberspace operations. Cyberspace operations may be modeled on an operational environment model. The operational environment model may be generated from network scan data, such as from an Nmap scan. An attack path may be developed by determining attacks to carry out on network elements in the operational environment model, and the attacks may be selected based on a probability of effect that the attack has an impact on the network element. Functional modeling techniques for modeling the physical impact of attacks on network elements are also disclosed.

In some aspects, the techniques described herein relate to one or more non-transitory computer-readable media storing computer-executable instructions that, when executed by at least one processor, perform a method of simulating a cyberspace operation on an operational environment model, including: receiving network and connectivity data for modeling the operational environment model, the operational environment model including a plurality of network elements, wherein each network element of the plurality of network elements includes one or more possible configurations; calculating, based on a first likelihood of a network element having each of the one or more possible configurations, an effect probability for a capability acting on the network element; calculating, based on a second likelihood of a successive network element having each of the one or more possible configurations and on a state of a preceding network element, at least one additional effect probability for at least one successive network element to obtain a plurality of effect probabilities; calculating, based on the plurality of effect probabilities, a success probability for the cyberspace operation on the operational environment model; and generating an attack graph for the operational environment model based on the success probability, the attack graph including an attack path through the operational environment model corresponding to the success probability.

In some aspects, the techniques described herein relate to one or more non-transitory computer-readable media, wherein the effect probability is determined further based in part on an uncertainty associated with the capability.

In some aspects, the techniques described herein relate to one or more non-transitory computer-readable media, wherein the effect probability is determined further based in part on at least one of: an access status of the network element or a vulnerability associated with the network element.

In some aspects, the techniques described herein relate to one or more non-transitory computer-readable media, the method further including: determining an updated network resiliency score for the network element based on the effect probability; and determining an updated overall resiliency score for the operational environment model based on the updated network resiliency score.

In some aspects, the techniques described herein relate to one or more non-transitory computer-readable media, the method further including: responsive to determining the network element has an unknown configuration, predicting the unknown configuration using a linear regression forecast to obtain a predicted configuration; and determining the effect probability of the capability on the network element based on common vulnerabilities between the predicted configuration and at least one known configuration for the network element.

In some aspects, the techniques described herein relate to one or more non-transitory computer-readable media, the method further including: modeling a defensive action responsive to the capability acting on the network element, wherein the at least one additional effect probability for the successive network element is determined further based in part on the defensive action.

In some aspects, the techniques described herein relate to one or more non-transitory computer-readable media, the method further including determining an optimal path through the operational environment model based in part on a probability of exploitability.

In some aspects, the techniques described herein relate to a system for simulating a cyberspace operation on an operational environment model, the system including: a database; at least one processor; and one or more non-transitory computer-readable media storing computer-executable instructions that, when executed by the at least one processor, cause the system perform a method of simulating the cyberspace operation on the operational environment model, the method including: receiving network and connectivity data for modeling the operational environment model, the operational environment model including a plurality of network elements; calculating an effect probability for at least a subset of the plurality of network elements in the operational environment model to obtain a plurality of effect probabilities, wherein the effect probability is based in part on a likelihood that a network element has one of a plurality of possible configurations; calculating a success probability of affecting a target network element of the plurality of network elements based on the plurality of effect probabilities; and generating an attack graph including an attack path through the operational environment model to the target network element corresponding to the success probability.

In some aspects, the techniques described herein relate to a system, wherein each network element has a network state, and further including updating a state of the network element based on the effect probability.

In some aspects, the techniques described herein relate to a system, wherein the effect probability is further based on the network state.

In some aspects, the techniques described herein relate to a system, wherein determining the success probability includes computing a Bayesian probability based on the plurality of effect probabilities.

In some aspects, the techniques described herein relate to a system, wherein the likelihood of the network element having a possible configuration of the plurality of possible configurations is determined based on a machine learning model.

In some aspects, the techniques described herein relate to a system, the method further including: determining at least one further success probability for at least one other cyberspace operation on the operational environment model to obtain a plurality of success probabilities; and determining an optimal path through the operational environment model based on a highest success probability of the plurality of success probabilities.

In some aspects, the techniques described herein relate to a system, the method further including: receiving user input of a parameter to optimize for the attack path, wherein the parameter selected from a set consisting of: speed, detection risk, and attribution risk, and wherein the optimal path is optimized based on the parameter.

In some aspects, the techniques described herein relate to a computer-implemented method for simulating a cyberspace operation on an operational environment model, including: receiving network data and connectivity data for the operational environment model, the operational environment model including a plurality of network elements, wherein each of the plurality of network elements is associated with one or more configurations; assigning a likelihood to each of the one or more configurations for each network element of the plurality of network elements; calculating, for at least a subset of the plurality of network elements, an effect probability that a capability will have an impact on a network element to obtain a plurality of effect probabilities; calculating a plurality of success probabilities based on the plurality of effect probabilities; and generating an attack graph displaying at least one attack path to a target network element based on the plurality of success probabilities.

In some aspects, the techniques described herein relate to a computer-implemented method, wherein the operational environment model includes at least one firewall having user-defined firewall rules, and wherein the effect probability is determined based in part on the user-defined firewall rules.

In some aspects, the techniques described herein relate to a computer-implemented method, wherein the capability is a beacon, and further including: modeling a time associated with the capability; and notifying a user when the beacon needs to be contacted.

In some aspects, the techniques described herein relate to a computer-implemented method, further including calculating a resiliency score for the operational environment model based on the effect probability for each network element.

In some aspects, the techniques described herein relate to a computer-implemented method, wherein one or more network elements is associated with a network element resiliency score that is updated responsive to determining the effect probability.

In some aspects, the techniques described herein relate to a computer-implemented method, further including determining an optimal path through the operational environment model based on optimizing a parameter selected from a set consisting of: detection risk for the cyberspace operation, speed of the cyberspace operation, and attribution risk for the cyberspace operation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE FIGURES

Embodiments of the present disclosure are described in detail below with reference to the attached drawing figures, wherein.

Figure 1:
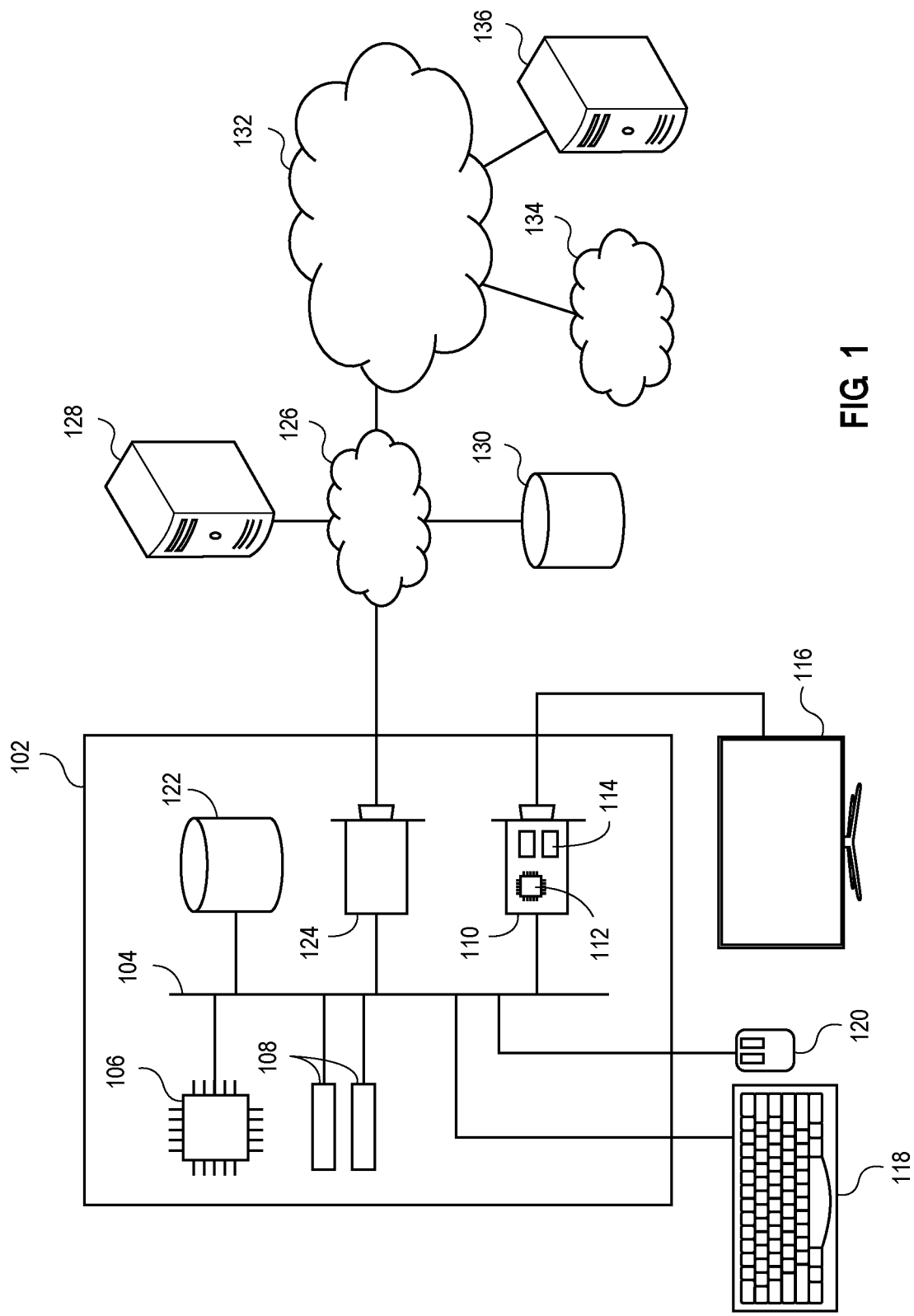
FIG. 1 illustrates an exemplary hardware platform for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments of the present disclosure are generally directed towards systems, methods, and non-transitory computer-readable media for simulating and predicting the effects of cyberspace operations on networks. Users may configure operational environment models of networks for modeling cyberspace operations thereon. Uncertainties in network elements and in capabilities may be characterized and accounted for when modeling cyberspace operations. Attack scenarios may be configured to determine the probability of effect (P-effect) for attacks based on target properties and available capabilities. In some embodiments, the P-effect is the probability that the capability has a behavioral and/or a functional impact on the target component. One or more probabilities of success (P-success) of the cyber operation on the operational environment model may be determined based on the P-effects. The respective P-successes may determine one or more attack paths that can be taken through the operational environment model to a goal network element. In some embodiments, the P-success is determined using a Bayesian likelihood of success conditioned on the P-successes of the component sub-operations. Functional modeling may determine the physical impacts of the cyberspace operations on the operational environment model.

Turning first to FIG. 1, an exemplary hardware platform for certain embodiments of the present disclosure is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses or components may communicate with each other directly. Connected to system bus 104 is central processing unit (CPU) 106, also referred to herein as a processor or a microprocessor. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and may be non-transitory computer-readable media storing data or computer-executable instructions for performing computer-implemented methods. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 402.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
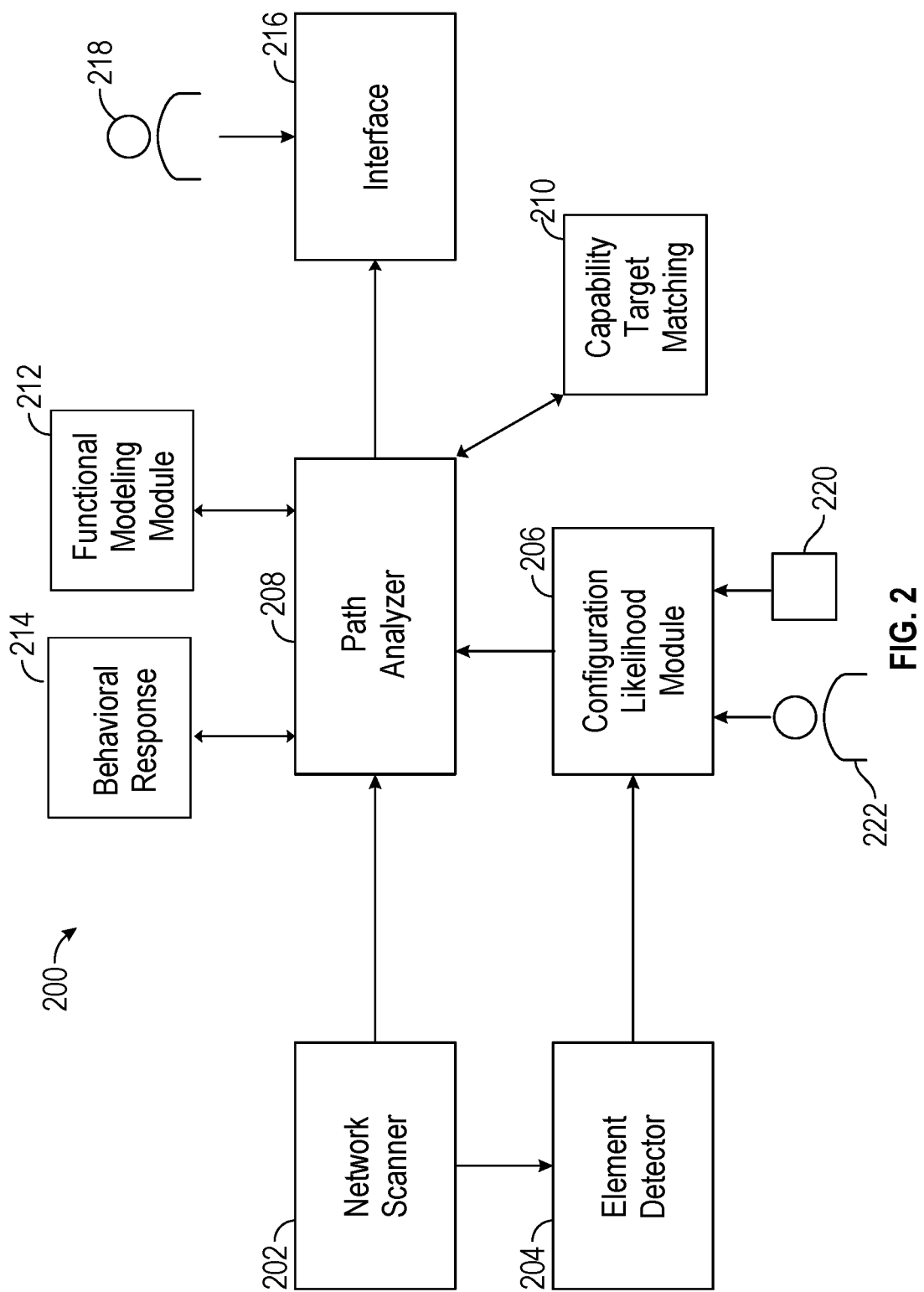
FIG. 2 illustrates a block diagram for some embodiments.
Figure 3:
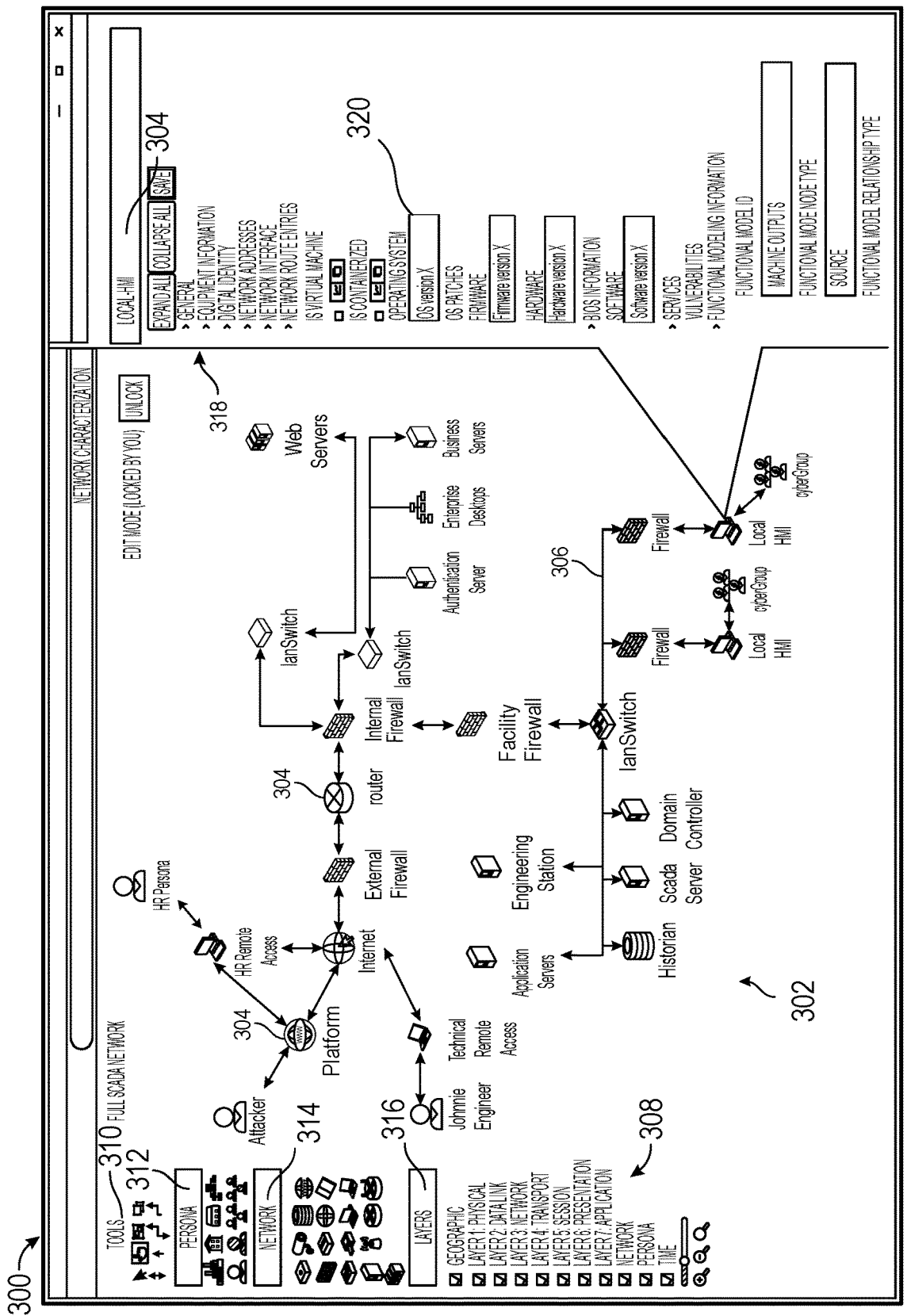
FIG. 3 illustrates a user interface having a representative operational environment model in accordance with embodiments of the present disclosure.

FIG. 2 illustrates a system 200 for modeling cyberspace operations on an operational environment model in accordance with embodiments of the present disclosure. The operational environment model may be a network model comprising a plurality of network elements and network connections between the network elements as shown in FIG. 3. At a high level, system 200 may comprise a network scanner 202, an element detector 204, a configuration likelihood module 206, a path analyzer 208, a capability target matching module 210, a functional modeling module 212, a behavioral response module 214, and an interface 216. A user 218 may configure operations of system 200 via interface 216, which may be a graphical user interface, a command line interface, or the like.

Network scanner 202 may be configured to scan an operational environment model and retrieve data about the operational environment model. The operational environment model may be a SCADA network, for example, or any other type of network. Network scanner 202 may be Nmap or similar network mapping software and retrieve service scans per node, multi-host scans, router configs, and the like. Users 218 may also manually configure the operational environment model via a graphical user interface, as discussed below. Element detector 204 may work with network scanner 202 to detect and map network elements from the scan to generate the operational environment model. In some embodiments, Nmap service scans are executed, and the network elements detected by network scanner 202 are populated with the ingested Nmap data. The Nmap scan can be used to pull relevant data such as host discovery information, port scanning, software/hardware version detection, MAC addresses, TCP/IP fingerprinting, and the like, which may be useful in determining the vulnerability of network elements as discussed below. Other data that may be retrieved includes client names, device names, network assets, services, packet filters/firewalls and respective configurations, and various other network attributes as is known to one of skill in the art.

Before conducting an operation, the precise configuration and interconnections of various network elements may not be precisely known. As such, configuration likelihood module 206 provides for the likelihood that a network element has a possible configuration of a plurality of possible configurations to be mapped. For example, one configuration for a network element may be a legacy software version that is vulnerable to a particular exploit but has a low install share among users. Thus, when determining the P-effect for a capability acting on the network element, the lower likelihood that the network element will have the legacy software version (as compared to the most recent software version for the network element) may be accounted for. As another example, the Nmap scan may discover a network element has ten released software versions, and likelihoods may be assigned to each of the ten released software versions. In some embodiments, the likelihoods are determined from the network mapping scan, are assigned by a model 220 (determined or trained by, e.g., machine learning, artificial intelligence, or data science), or are assigned by a subject matter expert 222. In some embodiments, model 220 assigns likelihoods and subject matter expert 222 manually adjusts the likelihoods as necessary.

In some embodiments, configuration likelihood module 206 is configured to determine likelihoods for unreleased and/or unknown configurations of a network element. Thus, a P-effect may be estimated for a capability acting on unreleased versions of the network element or configurations of the network element for which data was not retrieved by network scanner 202. In some embodiments, a linear regression forecast is utilized to determine the P-effect of a capability on an unknown network element configuration. For example, the linear regression forecast may predict that an unknown configuration will share X % of vulnerabilities with a known configuration. As discussed further below, a similarity between a capability and a target network element can be used to determine P-effect. Therefore, by predicting the unknown configuration using a linear regression forecast or other techniques, the effectiveness of the capability against both known and unknown network element configurations may be predicted, as a similarity between the capability and the predicted vulnerability can be modeled.

System 200 may comprise a path analyzer 208 for determining one or more attack paths through the operational environment model. An attack path may comprise the path that the cyber operation takes through the operational environment model from a starting network element to a goal network element. As used herein, a target network element is the network element that an attack is being carried out upon, while the goal network element is the endpoint network element for the cyber operation.

Figure 5A:
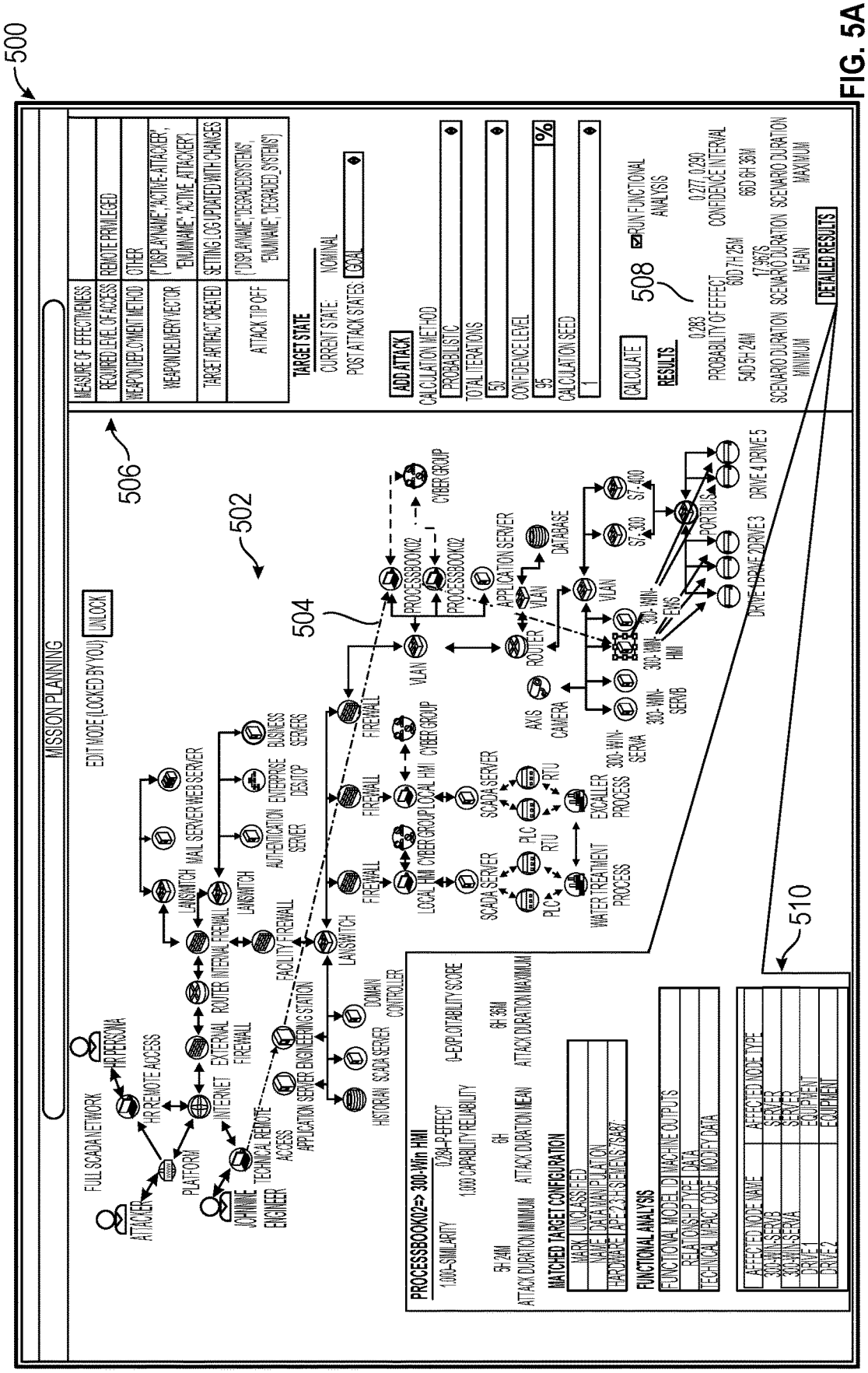
FIG. 5A illustrates an attack graph for some embodiments.

For example, turning briefly to FIG. 5A, an attack graph 502 is illustrated in which a platform network element 304 is the starting network element and the HMI network element is the goal network element. Accordingly, path analyzer 208 may analyze a plurality of possible attacks on target network elements in order to reach the goal network element from the starting network element, and each of the plurality of possible attacks may account for the likelihoods that the target network element has a possible configuration. For example, configuration likelihood module 206 may determine that there is a 25% probability that the network element has a first configuration, a 50% probability that the network element has a second configuration, and a 25% probability that the network element has a third configuration. As such, the P-effect for the capability acting on each of the possible configurations may be determined (i.e., P1, P2, and P3), and an overall P-effect can then be computed based on the P-effect for each configuration weighted according to the assigned likelihoods.

In some embodiments, path analyzer 208 may determine the attack path by selecting the attack path of the plurality of attack paths modeled on each network element that has the highest P-effect. In some embodiments, the attack path is generated to optimize an alternative parameter, such as risk of detection. Thus, the selected attack may be the attack with the lowest risk of detection rather than the attack with the highest P-effect. Other parameters which may be optimized include speed of the cyberspace operation, chance of attribution, shortest path through the operational environment model, or other similar parameters. In some embodiments, a shortest path algorithm (e.g., Dijkstra's algorithm, A* search, etc.) can be used, which may be useful for traversing through large operational environment models with a large number of network elements.

In some embodiments, user 218 can select multiple parameters to optimize, and system 200 generates an attack graph 502 having multiple attack paths corresponding to the selected parameters. For example, user 218 may select to optimize by each of speed, chance of attribution, and detection risk, and attack graph 502 will display the optimized path corresponding to each of the selected parameters. Thereafter, user 218 may elect one of the attack paths to execute on the operational environment model. In some embodiments, constraints can be set by user 218 when determining attack paths. For example, user 218 may elect to optimize to find the shortest path through the operational environment model while constraining path analyzer 208 to ensure that the cyber operation obtains access privileges at one or more network elements. Thus, the attack path generated by path analyzer 208 may not actually be the shortest path through the operational environment model if path analyzer 208 also determines that the access privilege constraint cannot be met along that path. One of skill in the art will appreciate that various combinations of optimized parameters and constraints may be used for determining a desired path through the operational environment model.

In some embodiments, system 200 comprises capability target matching module 210 for matching capabilities to targets in the operational environment model. In some embodiments, capability target matching module 210 is presented in a user interface (not shown) and allows user 218 to select one or more capabilities and one or more targets for each of the capabilities and determine which capabilities may be effective against which targets. Capability target matching module 210 may interface with path analyzer 208 for selecting capabilities to model on target network elements. Metrics, such as the similarity between the capability and the target network element, the reliability of the capability acting on the target network element, the exploitability of the target network element, and a measure of effectiveness of the capability acting on the target network element, may be computed and provided to user 218.

In some embodiments, the CVE (Common Vulnerabilities and Exposures) identifier identifying a vulnerability of the target network element which can be exploited by a particular capability is provided. As discussed herein, the effectiveness of a given capability on a target network element depends largely on the particular deployed version of the hardware or software of the target network element. However, the effectiveness of a capability of a given version of a target network element may not be reliably known and must be estimated based on the similarity of the deployed version to one or more known versions. Effectiveness of a given capability may additionally be affected by one or more of: uncertainty in the target (e.g., uncertainties in software versions), differences in test configuration, and differences in deployed environment, and these uncertainties can also be characterized and modeled. Various capabilities may be provided for deployment in the operational environment model in various combinations depending on the selected attack path. For example, zero day exploits, malware, phishing, password, denial of service and distributed denial of service, malware beaconing, and the like may be modeled. Other types of cyberattacks that may be used will be apparent to one of skill in the art.

It is one advantage of the present disclosure that, along with uncertainties in network elements, uncertainties in capabilities may also be characterized. By characterizing uncertainties in both network elements and capabilities, the estimation of the P-effect may be improved. The uncertainties of a capability may be determined from empirical data. For example, the uncertainty of a capability may be modeled based on a known success rate of the capability acting on the network element. In some embodiments, uncertainties for capabilities can be characterized using a beta distribution.

In some embodiments, a Monte Carlo simulation is used to determine the P-effect, and the Monte Carlo simulation may consider both uncertainties in the network element and uncertainties in the capability. In some embodiments, uncertainties are manually inputted via interface 216. For example, for a plurality of possible software versions of a network element retrieved from an Nmap service scan, subject matter expert 222 may input or adjust likelihood data for each possible software version of the plurality. In some embodiments, capabilities may be characterized by one or more of targeted components and dependencies, testing configuration(s), intended effect on target, deployment method/vector, expected attack consequences, and required preconditions. Uncertainties in the aforementioned may be characterized and accounted for when computing P-effects. Additionally, one or more of the targeted components and dependencies, testing configuration(s), intended effect on target, deployment method/vector, expected attack consequences, and required preconditions may be inputted by the user or retrieved from network scanner 202 and modeled for determining the P-effect.

In some embodiments, uncertainties are characterized based on a known standard, such as the ICD (Intelligence Community Directive) 303 analytic standard. In some embodiments, machine learning, data science, and/or artificial intelligence techniques may be used to learn uncertainties associated with a network element and/or capability. In some embodiments, various detectability concerns may be accounted for when characterizing capabilities. As one example, the detectability concern may be a chance of discovery. As another example, the detectability concern may be attack signs. As still another example, the detectability concern may be possible attack artifacts. As discussed herein, determination of attack paths through the operational environment model may be optimized to minimize or maximize various parameters, such as minimizing the chance of discovery or attack artifacts.

System 200 may also comprise functional modeling module 212 that is configured to model the physical effects that a cyberspace attack on a network element has on the operational environment model as a whole. Functional modeling module 212 may model the overall reliability or resiliency of a network (e.g., the SCADA network), which may change responsive to an attack thereon. In some embodiments, a resiliency score for the operational environment model can be modeled, wherein the resiliency score is a measure of how well the operational environment model performs relative to the operational environment model operating at full capacity. As an example, the resiliency score may be measured on a scale of 0 to 1, and a score of 1 indicates that the operational environment model is initially fully operational. However, if a cyberspace operation is enacted on the operational environment model and compromises one or more network elements thereof, the resiliency score may be lowered.

In some embodiments, each network element is associated with a resilience weight indicating how the network element contributes to the overall resiliency score of the operational environment model and/or individual resiliency score. A network element that is critical to the operations of the network may have a resiliency weight that is higher than a network element that is not critical to operations. In some embodiments, compromising a network element lowers the individual resiliency scores of other network elements that are connected or otherwise depend on the operations of the compromised network element. As discussed below, in some embodiments, system 200 may be used to model a cyberspace operation to have a desired effect (e.g., lower the resiliency score below a threshold number, compromise a critical component in the network, etc.) and generate an attack graph that displays an attack path through the network to achieve the desired effect. In some embodiments, functional modeling module 212 utilizes SysML to model the physical effects of cyber operations on networks. One of skill in the art will appreciate that various methods for modeling the resiliency score of an operational environment model may be used without departing from the scope hereof.

System 200 may also comprise a behavioral response module 214 that may model a response of a target network element to an attack thereon. In some embodiments, behavior of network elements is modeled by assigning states to at least a subset of the network elements in the operational environment model. The state may be a compromised state, in which the network element has been compromised, or an uncompromised state, in which the network element has not been compromised. Other states such as a vulnerable state or an inaccessible state may also be set. The vulnerable state may indicate that the network element is likely to be accessible by the attack (e.g., greater than 50% chance to gain access to the network element). The inaccessible state may indicate that the attacker cannot or is highly unlikely to be able to access the target network element. As one example, network elements disconnected from the network may have their state set to inaccessible. As such, path analyzer 208 may find a path through the operational environment model that does not require traversing through the inaccessible network element. In some embodiments, behavioral response module 214 is updated responsive to each action taken at a network element. Thus, the probability of effect for a network element may be determined based in part on the state of one or more preceding network elements in the operational environment model.

As one example of modeling behavior, if an attacker successfully gains local access to a target's computer, the target may notice the compromised state of the computer and shut the computer off, disconnect the computer from the network, or take other defensive actions such as modifying firewall rules. Such defensive actions and other actions responsive to an attack or other state changes of a network element may be modeled by behavioral response module 214. The P-effects for successive network elements may be computed based on the new state of the network element that changes based on an attack or other cyber operation thereon. Other defensive actions may be specific to particular defensive components that may be modeled, such as intrusion detection systems, firewalls, state-based firewalls, and the like. In some embodiments, dynamic firewall rules are modeled. For example, in an actual target environment, an alert network operator may notice an operation in progress and update the firewall rules to impede or disrupt the operation by, for example, blocking traffic from a particular source IP address. To model such scenarios, user 218 may configure one or more sets of firewall rules for any firewalls in the operational environment model, and different sets of rules may be enabled based on probabilistic events in the model.

In some embodiments, path analyzer 208 models attack paths (shown and described below with respect to FIG. 5A) to optimize the paths, based states of network elements 304. When optimizing based on element states, the generation of the potential path to a target or goal network element 304 may be automated, thereby increasing the efficiency in developing the course of action. In some embodiments, system 200 is configured to model one or more attacks on a network element 304, present the results to user 218, receive a go/no-go command or other instructions from the user, and then simulate the next attack inputted by user 218. Key metrics such as probability of exploitability and the Common Vulnerability Scoring System (CVSS) score for a given exploit may also be leveraged for optimizing the cyber operations. In some embodiments, the probability of exploitability is the probability that an attacker can exploit a network element 304 to achieve a desired end (for example, traffic forwarding through a firewall, access to stored data, persisting access to a given element, or any other operationally desirable result). State-based path optimization may also consider complete and/or incomplete paths through network routes and/or the state of the network element 304 and the operational environment model 302 as a whole.

Behavioral response module 214 may also model attack persistence such that network element states and attacks can be emulated temporally. For example, if a capability is configured to place a beacon on a router, wherein the beacon has an expiry of 30 days from placement, behavioral response module 214 may model and monitor the beacon lifespan. Therefore, near the 30 day expiration date, system 200 may notify user 218 that the beacon needs to be contacted to ensure the beacon is still working as intended. In some embodiments, persistence is modeled by setting a state of the network element and modeling state changes over time. If the network element changes state over time, the state change can be pushed to user 218, and user 218 can adjust the cyberspace operation accordingly. Thus, if user 218, acting as the attacker on an operational environment model, loses access to a compromised network element, the state of the network element may be changed to uncompromised. Thereafter, user 218 may proceed with another attack on the network element to attempt to regain access.

Persistency modeling may also factor in scheduling and time uncertainties and may include modeling response and reconstitution of network elements in the operational environment model as described above. Time uncertainties may factor into attack scenarios in mission planning and overall P-effect calculations. For example, uncertainties with respect to a time that an attack on one or more network elements 304 is carried out may be factored into the determination of P-effect on the one or more network elements 304. Parameters such as attack and/or scenario start time, attack and/or scenario end time, attack and/or scenario duration may be considered by the temporal model. For example, the amount of time to gain elevated privileges at a compromised network element may be modeled and P-effects for the attack may be factored in this uncertainty. One of skill in the art will appreciate other temporal parameters that may be factored into the determination of the P-effect of network elements 304 and P-success of an attack on an operational environment model. In some embodiments, once the simulation of the cyber operation or attack is complete, the results may be sent to interface 216. In some embodiments, interface 216 is configured for user 218 to provide input for executing the simulated cyberspace operation, such as a go/no go command for an attack.

Turning now to FIG. 3, a user interface 300 for configuring an operational environment model 302 is depicted for some embodiments. Simulation of cyberspace operation effects may begin with configuration of operational environment model 302. As described above, operational environment model 302 may comprise a plurality of network elements 304 connected by edges 306 representative of network connections therebetween. Network elements 304 may take various forms, such as switches, controllers, databases, servers, network devices, or any other device within user interface 300. As discussed above, operational environment model 302 may be generated via an Nmap scan (or other network mapping scan), received intelligence, or subject matter expert input, or by any other means of characterizing the target network.

User 218 may also manually configure operational environment model 302 via drag-and-drop or other like input methods in user interface 300. As shown, operational environment model 302 is a SCADA network, and an attacker is attempting to compromise a particular network element (for example, the network element 304 representing 300-WIN-HMI) via a particular access (ingress) point (for example, the network element 304 representing the www platform). A sidebar pane 308 of user interface 300 may comprise various tools for configuring operational environment model 302. In some embodiments, sidebar pane 308 comprises tools 310, persona toolbox 312, network elements toolbox 314, and layers 316. Zoom and search tools may also be provided.

Tools 310 may comprise various tools for editing operational environment model 302. In some embodiments, tools 310 comprises copy and paste options and pointer tools. Users may add edges 306 to connect network elements 304 via unidirectional and bidirectional edges 306 provided in tools 310. Persona toolbox 312 may comprise various personas for adding to operational environment model 302. Network elements toolbox 314 may comprise various network elements 304 that can be added to operational environment model 302. One of skill in the art will appreciate that various personas and network elements may be provided in persona toolbox 312 and network elements toolbox 314 for different types of operational environment models 302. Each network element 304 added to operational environment model 302 via sidebar pane 308 may be configured by user 218. For example, each network element 304 representing a persona may be assigned a name (e.g., Attacker or Johnnie Engineer). Similarly, network elements 304 representing network functionality may be named (e.g., router, firewall, or desktop), along with network elements 304 representing functional components (e.g., SCADA server or water treatment process). Additionally, the operational environment model 302 itself may be given a name. An edit mode may be provided to lock further changes to the operational environment model 302 and may be toggleable via an edit mode control. Names and other identifiers and features of network elements 304 may be automatically retrieved from network scanner 202 as discussed above or manually entered. Layers 316 may comprise the seven OSI (open systems interconnection) layers (i.e., application, presentation, session, transport, network, data link, and physical). Each of the seven OSI layers may be toggleable on and off in user interface 300 to represent the connectivity and state of the network at that level. For example, elements separated by a firewall may be (indirectly) connected at the data link layer but disconnected at the network later as a given state of the operation. Network elements 304 operating on a layer and/or edges 306 therebetween may be also hidden from view on user interface 300 when the corresponding layer is toggled off. As shown, the display of network elements 304 and personas may also be toggled on and off. Additional toggles to display time and geographic information may be provided. Toggling on the time option may enable persistence modeling, as discussed above. Enabling the geography toggle may display geographic information relating to the network elements 304.

Each network element 304 may have a plurality of features (also referred to as parameters and characteristics herein) that are configurable by user 218. In some embodiments, the features are auto-populated based on the data retrieved by network scanner 202. As shown in window 318 of user interface 300, a network element 304 may be selected by user 218 to view and edit the features thereof. For example, the HMI network element 304 has been selected and details thereof are shown in window 318. Parameters of a network element 304 may include network addresses, network interfaces, network route entries, is/is not a virtual machine, is/is not containerized, operating system version, operating system patches, firmware, hardware, BIOS information, software information, services, vulnerabilities, and the like. In some embodiments, uncertainties associated with the feature may be defined by user 218 via an uncertainties control 320. Actuation of uncertainties control 320 may cause display of a window (not shown) for inputting uncertainty information, such as statistical distribution parameters defining the uncertainty.

Network Vulnerability and States

Figure 4:
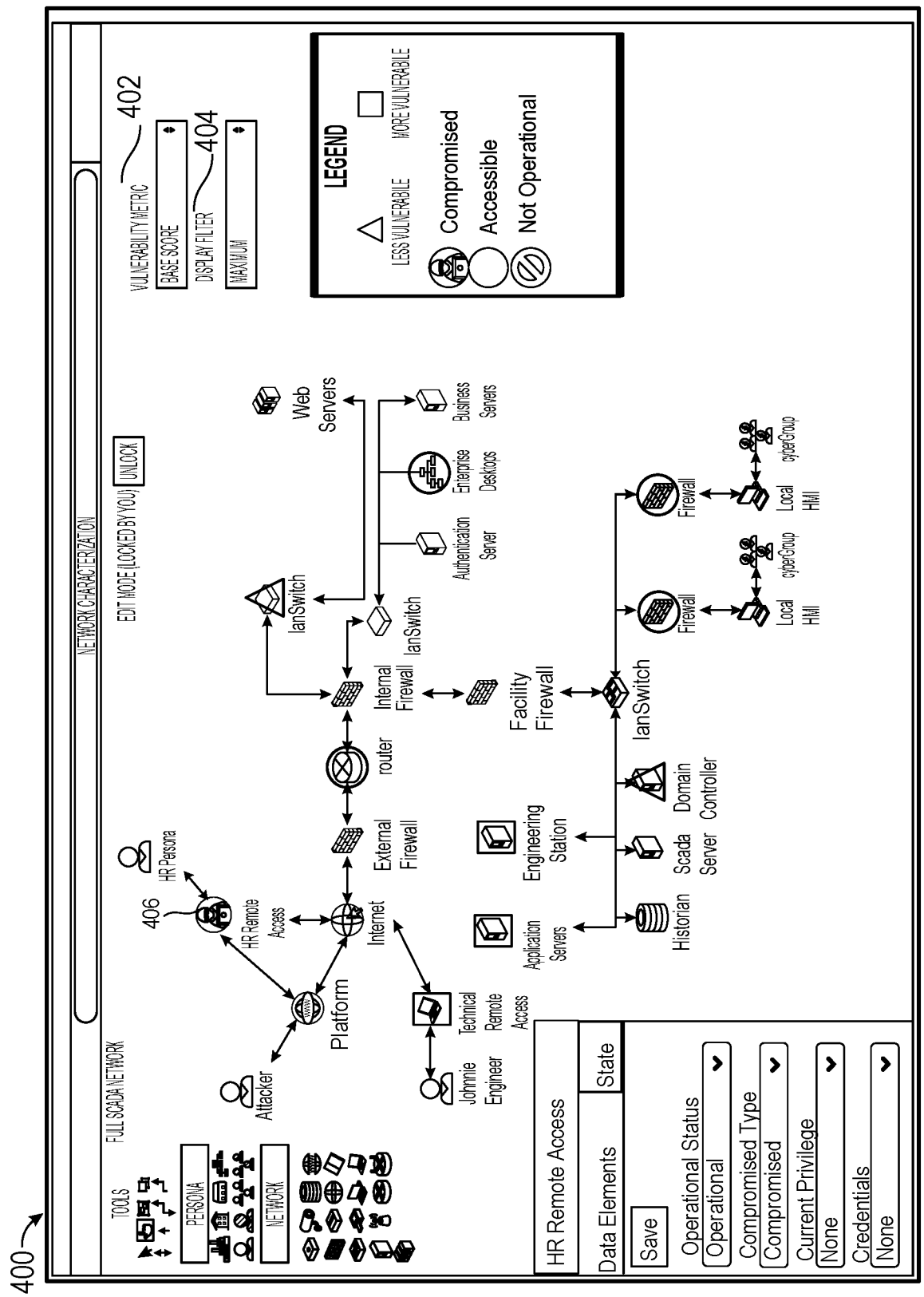
FIG. 4 illustrates the operational environment model with vulnerabilities and states depicted for some embodiments.

Turning now to FIG. 4, a user interface 400 illustrating vulnerabilities and states of network elements 304 in operational environment model 302 is depicted for some embodiments. For legibility, reference numerals are not repeated where they carry over from FIG. 3 for corresponding elements. In some embodiments, once the operational environment model 302 is generated and features, characteristics, and/or uncertainties of network elements 304 have been inputted and/or imported as desired by user 218, the vulnerabilities of operational environment model 302 may be characterized by system 200. User 218 may select a vulnerability metric 402 and display filters 404 for calculation and display of the vulnerabilities of network elements 304. In some embodiments, the vulnerability metric 402 is one of the CVSS base score, the CVSS exploitability score, or the CVSS impact score. Other vulnerability metrics may be used without departing from the scope hereof. In some embodiments, display filters 404 includes filtering by maximum, accumulate, and weighted accumulate. Other display filters 404 may be used. Thus, via user interface 400, user 218 may view which network elements 304 are susceptible to one or more vulnerabilities and may configure a cyberspace operation on the operational environment model 302 accordingly. As the cyberspace operation is carried out, vulnerabilities of network elements 304 may be recalculated.

As shown in user interface 400, network elements 304 determined to be less vulnerable are bounded by a triangle and network elements 304 determined to be most vulnerable are bounded by a square. Other methods of illustrating the vulnerability of network elements 304 may be used, such as a color gradient, with each network element 304 highlighted in a color corresponding to the vulnerability thereof. Thus, user interface 400 provides a highly intuitive visualization of the vulnerabilities in a user interface 400.

In some embodiments, the vulnerabilities are determined based on a similarity between a target network element 304 and one or more known-vulnerable target elements, as discussed above. In some embodiments, the similarity is determined using a string comparison between version name strings. Software versions that have the same string may be assumed to share the same vulnerabilities. Software versions with differing strings may be assumed to have differing vulnerabilities. Thus, when determining the effectiveness of a capability acting on a network element 304, if no or insufficient empirical data exists for the capability on a possible configuration of the network elements 304 exists, the string similarity between the possible configuration and a configuration of network elements 304 for which data exists may be used to model the effectiveness of the capability on the possible configuration for which data does not exist.

In other embodiments, the software code itself is analyzed to determine similarities based on a number or fraction of changed lines of code between the two versions. For example, for a given network element it may be the case that version 1.0.0 is known to be vulnerable, version 1.0.10 is known to not be vulnerable, and the target version is version 1.0.5. It may further be the case that 1000 lines of code change between version 1.0.0 and 1.0.5, with 500 further lines changing between 1.0.5 and 1.0.10. Based on a changed-lines-of-code metric, version 1.0.5 is two-thirds of the way from version 1.0.0 to 1.0.10, and the likelihood of vulnerability would be one third. Other source code similarity metrics are also contemplated as being within the scope of the invention. In still other embodiments, the similarity is determined using binary code similarity methods to compare executables for two different versions of a network element, in an analogous process to the source code similarity process described above.

In yet other embodiments, a dynamic similarity model is used to measure similarity. For example, the dynamic similarity model may be configured to compute the based on a fraction of common vulnerabilities between two configurations and the total number of vulnerabilities associated with each of the two configurations. The dynamic similarity model may be configured to predict vulnerabilities of new and/or unknown software versions based in part on known versions of the software to determine the probability that an existing capability can have the desired effect on the network element having the unknown configuration as discussed above. If the determined probability falls below a threshold, user 218 may be notified to select a different capability and/or to update the capability for the new/unknown software version. An unknown configuration may be a configuration for which empirical data of a capability acting thereon is unavailable and/or a configuration for which vulnerability data is unavailable. In some embodiments, a linear regression prediction is employed to model missing data. In some embodiments, system 200 is communicatively coupled to one or more databases from which vulnerability data may be read and used to determine similarity for unknown configurations.

User interface 400 also illustrates states of network elements 304 in operational environment model 302 for some embodiments. States of network elements 304 may be depicted on user interface 400 and updated as the simulation progresses based on the determined impact of attacks on network elements 304. As shown, some network elements (such as the HR Remote Access element 406) have their state set to (or determined to be) "compromised." Thus, cyber actions on operational environment model 302 may be characterized when the HR Remote Access element is compromised. Other states that a network element 304 may take on include an accessible state, a vulnerable state, and a not operational state. Network elements 304 without a designated state may be considered uncompromised.

As shown, user 218 may configure state parameters for each network element 304 such as an operational state (operational or not operational), a compromised type (compromised or not compromised), current privilege (e.g., none, user, root) credentials (e.g., none, user, root) or any combination thereof. Based on the inputted state parameters, the display of network element 304 on user interface 400 may be updated. For example, an icon indicative of a compromised node may be displayed, as depicted with respect to the HR Remote Access network elements. As the cyberspace operation is simulated, determination of P-effect for network elements 304 may account for the state parameters set by user 218, such as whether user 218 indicates a network element 304 is operational or non-operational.

Attack Graphs

Looking now at FIG. 5A, a user interface 500 depicting an attack graph 502 for the operational environment model 302 is depicted for some embodiments. FIG. 5A illustrates an expanded view of operational environment model 302 illustrated in FIGS. 3 and 4. As discussed above, cyberspace operations on an operational environment model 302 may be modeled to generate an attack graph 502 having one or more attack paths 504 illustrating possible paths through operational environment model 302 to reach a goal network element. Attack graphs 502 allow the user to model and estimate effectiveness for access and effects-based capabilities. As shown in FIG. 5A, the attack path 504 goes from the Technical Remote Access network element to the Engineering Station network element to the Process Book network element and ends at the HMI network element, providing the attacker access to the various Drive network elements.

User interface 500 may comprise an attack window 506 where users 218 can configure cyber operations to simulate on operational environment model 302. As shown, information relating to an attack such as measure of effectiveness, required level of access, capability deployment method, capability delivery vector, target artifacts created by the capability, attack tip off, and the like may be displayed. When configuring attacks, users may input a calculation method, a number of iterations, a confidence level, a calculation seed, or any combination thereof. The number of iterations defines the number of times the simulation is run. The calculation seed may be used to initialize a pseudorandom number generator. In some embodiments, the calculation method is one of a deterministic or a probabilistic calculation method. For deterministic calculation methods, the mean value of the beta distribution for a capability may be used when performance data relating to capability reliability is available. For situations where capability reliability data is unavailable, CVSS exploitability scores may be used. For probabilistic calculation methods, capability reliability may be modeled using a beta distribution, and system 200 may generate mean and confidence intervals of randomly generated samples taken from the beta distribution. As discussed above, the reliability of a capability may be determined based in part on empirical data, such as a success rate of the capability on a target network element. Other metrics may be used to model the capability reliability without departing from the scope hereof.

Attack window 506 may display results 508 of the cyber operation. In some embodiments, results 508 comprise the computed P-effect, the confidence interval for the P-effect, and scenario duration statistics. For example, as illustrated, the minimum, maximum, and mean scenario durations may be provided for the number of simulated iterations of the scenario. In some embodiments, the scenario comprises an accumulation of all attacks that have been enacted on the operational environment model 302. If attack window 506 is displaying data related to the goal network element, P-success results may also be shown for the attack path 504 taken to the goal network element 558. Additional results 508 for the network element 304 may be viewed via actuation of a control, upon which an additional results pane 510 may be displayed.

Additional results pane 510 may display the similarity score between the network element 304 and the closest known configuration, the capability reliability score, an exploitability score, or any combination thereof. The exploitability score may be the CVSS Exploitability score and indicates how the vulnerability is accessed, the complexity of the attack, and the number of times an attacker must authenticate to successfully exploit a vulnerability. Other CVSS metrics may be selected by user 218 for display. In some embodiments, the start state (e.g., uncompromised) and end state (e.g., compromised) of network element 304 are displayed. Furthermore, configuration details on the target network element 304 are also shown, such as a mark (i.e., classified or unclassified), a name, and hardware.

Results from the functional modeling module 212 may also be displayed in additional results pane 510 or elsewhere in user interface 500. As shown, a model ID, a relationship type, and a technical impact code are displayed. The model ID may identify the functional model used to model impacts on the system. The relationship type may indicate the relationship between the two network elements in the attack, in this case, the Process Book network element 304 and the HMI network element 304. The technical impact code may display the technical impact of the attack, such as modify data, delete data, elevate privilege, and the like. Additionally, other network elements 304 affected by the attack on the target network element 304 are displayed.

In some embodiments, the individual resiliency score of the network element 304 may be displayed. In some embodiments, a new overall resiliency score of the operational environment model 302 may be calculated and displayed, considering the new individual resiliency score for the target network element 304. For example, user 218 may use system 200 to simulate attacks on the SCADA network to determine vulnerabilities thereof such that corrective actions may be taken to improve the security of the SCADA network. As the attacker moves throughout operational environment model 302 and compromises various network elements 304 therein, the overall resiliency score may be lowered. In some embodiments, network elements 304 can be selected by user 218 in user interface 500 to view the individual resiliency score thereof. In some embodiments, user 218 can assign individual resiliency scores to network elements 304 when configuring operational environment model 302.

Figure 5B:
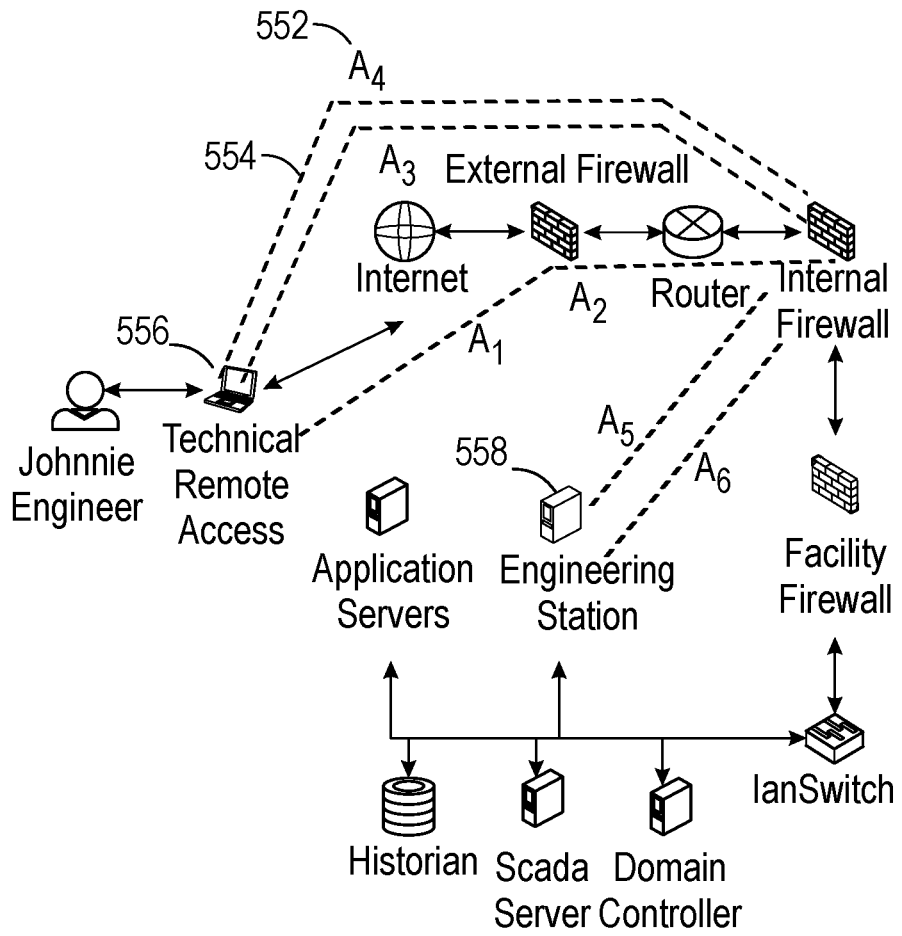
FIG. 5B schematically depicts generating attack paths for some embodiments.

FIG. 5B schematically illustrates how an attack path 504 may be determined for some embodiments. For clarity of illustration, FIG. 5B illustrates only a subset of the network elements 304 on the attack path 504 depicted in FIG. 5A. In some embodiments, when determining P-effects for attacks 552, mutual independence sequence modeling is employed. The mutual independent sequence model may assume mutual independence between attacks 552 such that the result of a preceding attack in attack path 504 has no effect on the determination of P-effect for subsequent attacks. In some such embodiments, the P-success is computed by multiplying together each P-effect in the attack path 504. For example, a first attack may be a lateral movement to gain local access to a target network element 304, which has a first P-effect (P1) of the attack having the intended effect. A second action may be to elevate privileges on the target network element 304, which has a second P-effect (P2). The computation of P2, therefore, does not account for the likelihood that the first attack was successful. For state-independent modeling, the P-success of elevating the privileges may be P-Success=P(P2*P1). Thus, the mutual independence sequence model provides an attack conservative model that does not consider the state of the target such that the state of each target at initialization of operational environment model 302 is the state used for determining the P-effect. In some embodiments, the state of one or more network elements 304 may be inputted by user 218. In some embodiments, the state of one or more network elements 304 is retrieved from network scanner 202. In some embodiments, the state of a network element 304 is based on the determined vulnerabilities thereof.

In some embodiments, when determining P-effects for attacks 552, an exploit chaining sequencing model is used. The exploit chaining sequencing model may assume conditional dependence such that the state of the network elements 304 in operational environment model 302 is considered when determining the P-effect. Conditions of network elements 304 that may be considered include, but are not limited to, the status of access (e.g., accessible, vulnerable, etc.), the state of the targeted software (e.g., compromised, uncompromised, etc.), the existence of the indicated vulnerability of the targeted software, or any combination thereof. Thus, when determining P2 for gaining privileges, the likelihood that the first attack was successful is considered when calculating P2. Thus, contrary to the mutual independence model, the determination of a P-effect may account for states of preceding network elements 304 in attack path 504. In some embodiments, the P-effect is calculated by a combination of the marginal probability of each network element 304 together with a similarity score produced for each network element 304. In some embodiments, the similarity score is determined by national vulnerability data, with missing data predicted using a linear regressive prediction as discussed above. In some embodiments, the P-success is calculated using a Bayesian probability. Thus, returning to the above-example, for state-dependent modeling, the P-success of elevating the privileges may be P-Success=P1|P2.

At a high level, an attack path 504 may be determined by evaluating the P-effect of one or more attacks 552 on a target network element 304 and selecting the attack of the one or more attacks with the highest P-effect. In some embodiments, an attack that optimizes a desired parameter (e.g., speed) is selected. This process may be repeated from network element 304 to network element 304 until an attack path 504 is formed by the plurality of attack path edges 554 between a starting network element 556 and a goal network element 558.

In the operational environment model illustrated in FIG. 5B, the Technical Remote Access network element is the starting network element 556, and the engineering station network element is the goal network element 558. In some embodiments, more than one network element 304 can be designated as a starting network element 556. In some embodiments, more than one network element 304 can be designated as a goal network element 558. For example, the goal of the functional modeling may be to compromise one or more critical network elements 304, and each of the critical network elements 304 may be selected as a goal network element 558. The attack path 504 may then be generated by evaluating attacks 552 on network elements 304 starting from the starting network element 556. For example, a first attack, A1, on the external firewall network element 304 may be evaluated by determining the P-effect that A1 has a behavioral or functional impact on the external firewall network element. As discussed above, uncertainties in network elements 304 and capabilities may be considered when determining the P-effect. Thus, an overall P-effect may be determined based on a plurality of P-effects computed for the capability of attack A1 on each of the plurality of possible configurations of the external firewall network element 304. A second attack, A2, from the external firewall network element 304 to the internal firewall network element 304 is also shown.

Two other attacks, A3 and A4, are depicted between starting network element 556 and the internal firewall network element 304. Attack A3 may utilize a capability distinct from attack A4. Like A1 described above, a P-effect that accounts for the plurality of possible configurations associated with the internal firewall network element 304 may be determined for both A3 and A4. Thus, in this example, when determining an attack path to reach the internal firewall network element 304, three P-effects may be compared: (1) a combined P-effect that the attacks A1 and A2 will have the desired impact (e.g., provide access) on the internal firewall network element; (2) the P-effect that the attack A3 will have the desired impact on the internal firewall network element; and (3) the P-effect that the attack A4 will have the desired impact on the internal firewall network element. Therefore, the attack or attack combination (e.g., A1 plus A2) that produces the highest P-effect may then be selected as the attack path 504.

From the internal firewall network element 304, two attacks, A5 and A6, are illustrated. As with the above-described attacks A1-A4, both A5 and A6 may have P-effects determined therefor based on a capability and the uncertainties associated with the target network element 304 and the capability. The attack with the higher P-effect may then be added to the attack path 504. In some embodiments, the attack path 504 is selected based on an attack path with the highest P-success. For example, the P-success for an attack path 504 formed by attacks A1, A2, and A6 may be compared against the P-success for an attack path 504 formed by attacks A3 and A5. In some embodiments, the determination of P-success for an attack path 504 does not consider attacks from a first network element to a second network element that have a lower P-effect than another attack from the first network element to the second network element. For example, when computing the P-success of an attack path 504 from starting network element 556 to goal network element 558, only the attack A3 may be considered for all paths through the operational environment model if A3 has a higher P-effect than A4.

EXEMPLARY METHODS

Figure 6:
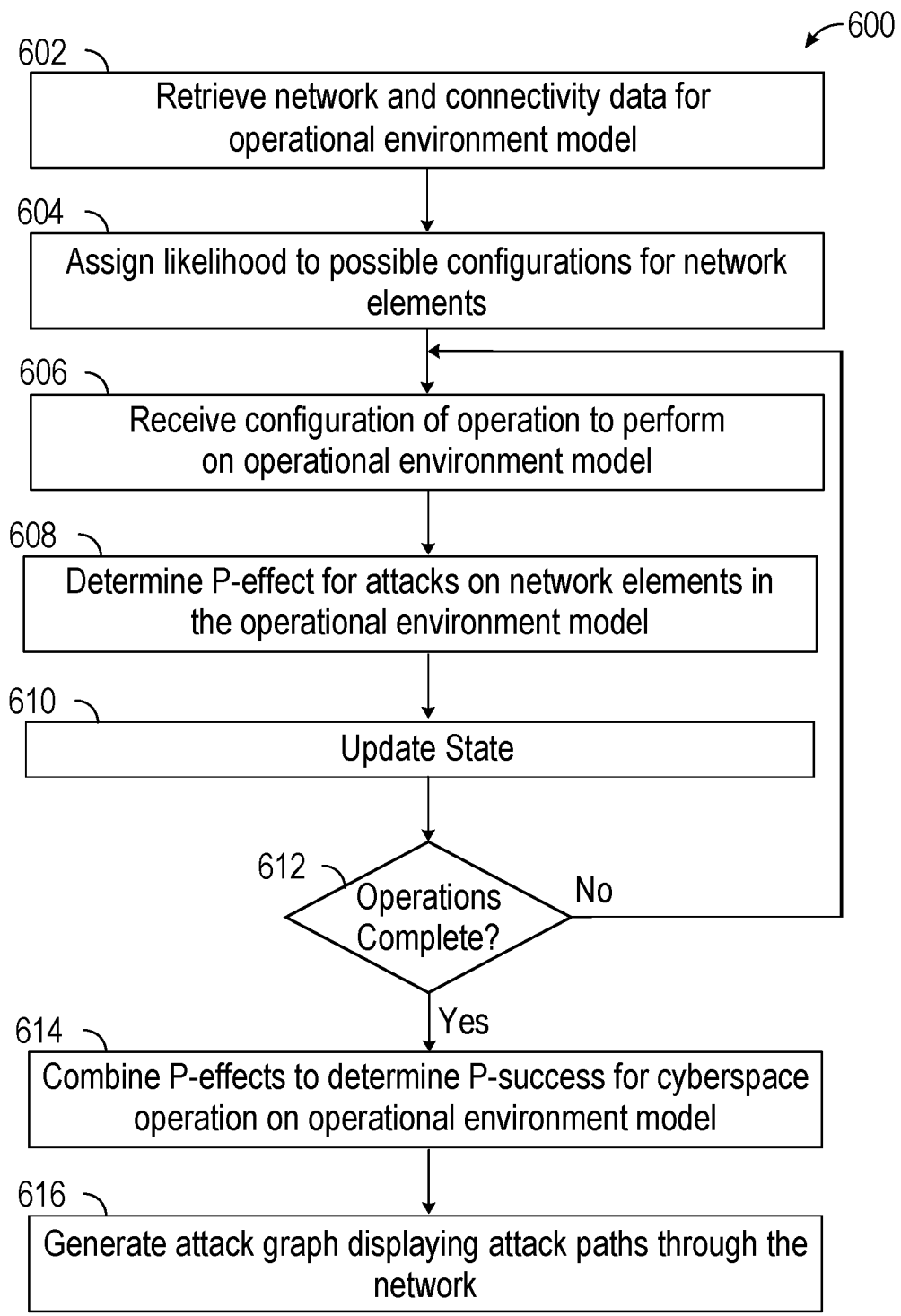
FIG. 6 illustrates an exemplary method in accordance with embodiments of the present disclosure.

Turning now to FIG. 6, a method 600 in accordance with embodiments of the present disclosure is shown. Processing may begin at step 602 where network data for the operational environment model operational environment model 302 is retrieved. For example, a network scan, such as an Nmap scan, may be performed to identify network elements 304 in the operational environment model 302 or known configuration may be input by User 218. User 218 may additionally manually adjust the retrieved network data for configuring the operational environment model 302. In some embodiments, operational environment models 302 may be shared between different users 218 of system 200. Thus, two users 218 may collaborate on the same operational environment model 302 to model cyberspace operations thereon for determining a best operation to perform on the operational environment model 302. In some embodiments, system 200 is configured to simulate cyberspace operations in real time. In some embodiments, system 200 is configured to speed up the simulation.

At step 604, configuration likelihoods may be assigned to network elements 304 to characterize uncertainties of the network elements 304. For example, likelihoods may be assigned that a network element 304 is running a certain software version, is running on a certain operating system, or the like. In some embodiments, the configuration likelihood data is retrieved with the network data at step 602. In some embodiments, a model 220 assigns configuration likelihood data to network elements 304. In some embodiments, a subject matter expert 222 manually inputs or adjusts the configuration likelihood data. In some embodiments, a combination of a model 220 and subject matter expert 222 is used to assign configuration likelihood data. In some embodiments, ICD 203-based analytic standards are used to determine configuration likelihood data. In some embodiments, uncertainty is manually configured using common statistical distributions. For example, the user may manually configure a beta statistical distribution with user-inputted alpha values and beta values.

At step 606, configuration of the cyberspace operation may be received. As discussed above, user 218 may input various parameters for simulating a cyberspace operation. For example, user 218 may specify one or more starting network elements 556 and/or one or more goal network elements 558. For functional modeling, user 218 may input a desired outcome, such as lowering the resiliency score by 50% or disabling a particular functionality. User 218 may also specify one or more capabilities to use in the operation and/or one or more capabilities to exclude using. In some embodiments, user 218 may configure the modeling to determine an optimized attack path based on a variable, such as speed, risk of detection, risk of attribution, path length, duration of operation, and the like.

At step 608, the P-effect may be determined for one or more network elements 304 in the operational environment model 302. As discussed above, the P-effect, in some embodiments, is the probability that a capability will have an impact on a target. Uncertainties in the target and the capability may be considered. For example, if one or more possible configurations for a particular network element includes a software version for which vulnerability to a particular capability is unknown, the probability of vulnerability may be calculated based on a similarity metric between the target version and one or more known versions, as discussed above. Thus, the P-effect may be a combination of multiple P-effects calculated for one or more possible configurations for the target network element 304 based on an estimated effectiveness of a particular capability for each of those configurations.

At step 610, the state of the target network element 304 may be updated based on the determined P-effect. For example, it may be the case that, once the cumulative P-effect across all network paths leading to a given element exceeds a predetermined threshold, the state of that network element changes to "compromised." Thereafter, at test 612, it may be determined whether the operations are complete. For example, operations may be determined to be complete if the state of the target network element 558 is changed to compromised. Alternatively, as described below, operations may be considered complete if enough elements have been compromised to reduce the overall resiliency score for the operational environment model to below a predetermined threshold. If operations are complete, processing may proceed to step 614. If operations are not complete, processing may proceed back to step 606. In some embodiments, processing instead proceeds back to step 608, and the cyber operations for network elements 304 are automatically performed by system 200 based on the user configurations input at step 606.

At step 614, once the cyberspace operations are complete, one or more P-successes may be determined. The P-success, in some embodiments, is the probability of success of the cyberspace operation achieving the goal, i.e., obtaining the desired effect on the goal network element 304 from the start network element 304. Thus, the P-success is based in part on the plurality of P-effects determined at step 606. Alternatively, the P-success may reflect an alternative goal given that the target network element 558 has been compromised. For example, success may be characterized a probability of detection being below a given threshold when target network element 558 is compromised, a probability that the attack can be attributed being below a given threshold when target network element 558 is compromised, target network element 558 being compromised within a given time frame, a combination of these metrics or any other metric for the success of a cyberoperation.

At step 616, an attack graph 502 may be generated that displays one or more attack paths 504 through operational environment model 302 reflecting one or more successful attack scenarios. In some embodiments, a single attack path 504 corresponding to the path through operational environment model 302 having the highest P-success is displayed. In some embodiments, more than one attack path 504 is displayed, such as the top three attack paths 504. In some embodiments, the attack path(s) displayed is selected based on other parameters. For example, user 218 may elect to optimize the cyberspace operation to minimize risk, minimize attribution, prioritize speed, or based on any other metric. Thus, the attack path 504 through the operational environment model 302 that is the quickest to complete may be displayed, even if said attack path 504 does not have the highest P-success. For example, the user 218 may elect to view both the attack path 504 having the highest P-success along with the attack paths 504 that optimize risk and speed through the network to provide user 218 with a display of the various attack path 504 through operational environment model 302.

Figure 7:
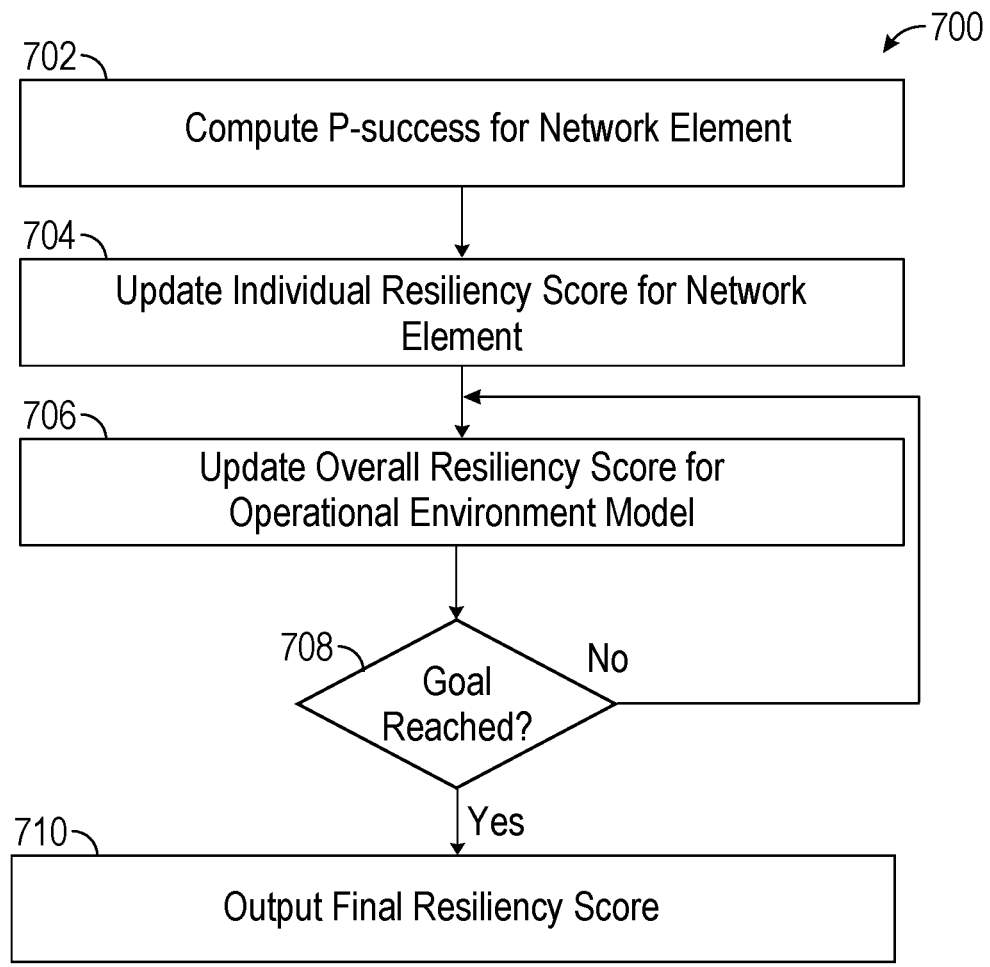
FIG. 7 illustrates an exemplary method for functional modeling for some embodiments.

FIG. 7 illustrates a method 700 for modeling functional effects of cyber operations on an operational environment model 302, in accordance with some embodiments. For example, method 700 may be performed in concert with method 600 above to determine when the overall resilience score of a target network falls below a given threshold to signal that the operation can be considered complete. Method 700 may begin at step 702 where the P-effect for an attack 552 on a network element 304 is determined. The P-effect may be determined using state independent methods or state dependent methods, as discussed above, based on one or more previously compromised (or otherwise affected) network elements. Thereafter, at step 704, an individual resiliency score for the affected network element 304 may be computed. The resulting updated individual resiliency score may be based on the P-effect. For example, if the P-effect is high, the computation of the individual resiliency score may be low because the attack is likely to compromise the network element 304. Therefore, the network element 304 may not function as intended. By contrast, if the P-effect is low, the computation of the individual resiliency score may produce a high individual resiliency score because the attack on the network element 304 is unlikely to affect the performance thereof. The resulting updated individual resiliency score may also be based on the effect on the network element. For example, if a network element is simply temporarily disabled, the decrease in the resiliency score may be lower than if the network element can be induced to permanently destroy one or more connected components.

Next, at step 706, the overall resiliency score of the operational environment model 302 may be updated, considering the new individual resiliency score of the network element 304 computed at step 704. In some embodiments, the overall resiliency score is a number between 0 and 1 such that, when each network element 304 is entirely operational, the overall resiliency score of the network is 1. For example, if there are two redundant controllers for a physical system, each of which is sufficient to maintain system operation, then fully disabling one of these controllers with perfect certainty might reduce the overall resiliency of the network to 0.5. Similarly, if the resiliency score of one controller is reduced from 1 to 0.7 and the resiliency of the other is reduced to 0.2, the overall resiliency of the network might be reduced from 1 to 0.45.

Of course, each of these controllers might itself have a number of (redundant or non-redundant) dependencies, each of which might have its own individual resiliency determined by its dependencies, and so on. Furthermore, some components may be dependencies for multiple other systems. For example, a backup power supply is likely to be a dependency for a number of systems and may or may not be redundant with other backup power supplies for those systems. Thus, changes in the resiliency score for an element may propagate to any elements for which it is a dependency. In some scenarios, dependency graphs may include cycles, or cycles may be removed from dependency graphs. Alternatively, it may be the case that the changes in the resiliency of one network element can only reduce the resiliency of other network elements, such that propagating changes in resiliencies will ultimately stabilize given the minimum value of 0 for resiliency scores.

Processing may then proceed to test 708, where it may be determined if a goal has been reached. The goal may be defined by user 218. In some embodiments, the goal is lowering the overall resiliency score to a goal score or by a goal percentage. One of skill in the art will appreciate the various goals that may be set when modeling cyberoperations on operational environment model 302. If the goal has not been reached, processing may proceed back to step 702, and an attack on the next network element 304 may be modeled to determine the P-effect for the attack. If the goal has been reached, processing may proceed to step 710, and the overall resiliency score may be displayed to user 218.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

1. One or more non-transitory computer-readable media storing computer-executable instructions that, when executed by at least one processor, perform a method of simulating a cyberspace operation on an operational environment model, comprising:

receiving network and connectivity data for modeling the operational environment model, the operational environment model comprising a plurality of network elements, wherein each network element of the plurality of network elements comprises one or more possible configurations;

calculating, based on a first likelihood of a network element having each of the one or more possible configurations, an effect probability for a capability acting on the network element;

calculating, based on a second likelihood of a successive network element having each of the one or more possible configurations and on a state of a preceding network element, at least one additional effect probability for at least one successive network element to obtain a plurality of effect probabilities;

calculating, based on the plurality of effect probabilities, a success probability for the cyberspace operation on the operational environment model; and generating an attack graph for the operational environment model based on the success probability, the attack graph comprising an attack path through the operational environment model corresponding to the success probability.

2. The one or more non-transitory computer-readable media of claim 1, wherein the effect probability is determined further based in part on an uncertainty associated with the capability.

3. The one or more non-transitory computer-readable media of claim 1, wherein the effect probability is determined further based in part on at least one of: an access status of the network element or a vulnerability associated with the network element.

4. The one or more non-transitory computer-readable media of claim 1, the method further comprising:
determining an updated network resiliency score for the network element based on the effect probability; and
determining an updated overall resiliency score for the operational environment model based on the updated network resiliency score.

5. The one or more non-transitory computer-readable media of claim 1, the method further comprising:
responsive to determining the network element has an unknown configuration, predicting the unknown configuration using a linear regression forecast to obtain a predicted configuration; and
determining the effect probability of the capability on the network element based on common vulnerabilities between the predicted configuration and at least one known configuration for the network element.

6. The one or more non-transitory computer-readable media of claim 1, the method further comprising:
modeling a defensive action responsive to the capability acting on the network element,
wherein the at least one additional effect probability for the successive network element is determined further based in part on the defensive action.

7. The one or more non-transitory computer-readable media of claim 1, the method further comprising determining an optimal path through the operational environment model based in part on a probability of exploitability.

8. A system for simulating a cyberspace operation on an operational environment model, the system comprising:
a database;
at least one processor; and
one or more non-transitory computer-readable media storing computer-executable instructions that, when executed by the at least one processor, cause the system perform a method of simulating the cyberspace operation on the operational environment model, the method comprising:
receiving network and connectivity data for modeling the operational environment model, the operational environment model comprising a plurality of network elements;
calculating an effect probability for at least a subset of the plurality of network elements in the operational environment model to obtain a plurality of effect probabilities,
wherein the effect probability is based in part on a likelihood that a network element has one of a plurality of possible configurations;
calculating a success probability of affecting a target network element of the plurality of network elements based on the plurality of effect probabilities; and
generating an attack graph comprising an attack path through the operational environment model to the target network element corresponding to the success probability.

9. The system of claim 8, wherein each network element has a network state, and further comprising updating a state of the network element based on the effect probability.

10. The system of claim 9, wherein the effect probability is further based on the network state.

11. The system of claim 9, wherein determining the success probability comprises computing a Bayesian probability based on the plurality of effect probabilities.

12. The system of claim 9, wherein the likelihood of the network element having a possible configuration of the plurality of possible configurations is determined based on a machine learning model.

13. The system of claim 12, the method further comprising:
determining at least one further success probability for at least one other cyberspace operation on the operational environment model to obtain a plurality of success probabilities; and
determining an optimal path through the operational environment model based on a highest success probability of the plurality of success probabilities.

14. The system of claim 13, the method further comprising:
receiving user input of a parameter to optimize for the attack path,
wherein the parameter selected from a set consisting of: speed, detection risk, and attribution risk, and
wherein the optimal path is optimized based on the parameter.

15. A computer-implemented method for simulating a cyberspace operation on an operational environment model, comprising:
receiving network data and connectivity data for the operational environment model, the operational environment model comprising a plurality of network elements,
wherein each of the plurality of network elements is associated with one or more configurations;
assigning a likelihood to each of the one or more configurations for each network element of the plurality of network elements;
calculating, for at least a subset of the plurality of network elements, an effect probability that a capability will have an impact on a network element to obtain a plurality of effect probabilities;
calculating a plurality of success probabilities based on the plurality of effect probabilities; and
generating an attack graph displaying at least one attack path to a target network element based on the plurality of success probabilities.

16. The computer-implemented method of claim 15,
wherein the operational environment model comprises at least one firewall having user-defined firewall rules, and
wherein the effect probability is determined based in part on the user-defined firewall rules.

17. The computer-implemented method of claim 15, wherein the capability is a beacon, and further comprising:
modeling a time associated with the capability; and
notifying a user when the beacon needs to be contacted.

18. The computer-implemented method of claim 15, further comprising calculating a resiliency score for the operational environment model based on the effect probability for each network element.

19. The computer-implemented method of claim 18, wherein one or more network elements is associated with a network element resiliency score that is updated responsive to determining the effect probability.

20. The computer-implemented method of claim 15, further comprising determining an optimal path through the operational environment model based on optimizing a parameter selected from a set consisting of: detection risk for the cyberspace operation, speed of the cyberspace operation, and attribution risk for the cyberspace operation.

* * * * *